United States Patent
Hosseini et al.

(10) Patent No.: US 10,652,169 B2
(45) Date of Patent: May 12, 2020

(54) HYBRID AUTOMATIC REPEAT REQUEST MANAGEMENT FOR DIFFERING TYPES OF HYBRID AUTOMATIC REPEAT REQUEST PROCESSES

(71) Applicant: QUALCOMM Incorporated, San Diego, CA (US)

(72) Inventors: Seyedkianoush Hosseini, San Diego, CA (US); Jing Sun, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 15/892,073

(22) Filed: Feb. 8, 2018

(65) Prior Publication Data

US 2018/0234359 A1 Aug. 16, 2018

Related U.S. Application Data

(60) Provisional application No. 62/457,804, filed on Feb. 10, 2017.

(51) Int. Cl.
*H04L 12/861* (2013.01)
*H04L 1/18* (2006.01)
*H04W 72/04* (2009.01)

(52) U.S. Cl.
CPC ............ *H04L 49/90* (2013.01); *H04L 1/1822* (2013.01); *H04L 1/1835* (2013.01);
(Continued)

(58) Field of Classification Search
CPC ... H04L 49/90; H04L 49/9052; H04L 1/1887; H04L 1/1896; H04L 1/1861; H04L 1/1812; H04W 72/0446
See application file for complete search history.

(56) References Cited

U.S. PATENT DOCUMENTS 9,319,196 B2 4/2016 Lee et al.
9,577,793 B2 2/2017 Davydov et al.
(Continued)

OTHER PUBLICATIONS

Ericsson: "HARQ Process Operation with Legacy TTIs, Reduced Processing, and sTTIs", 3GPP Draft; R1-1611532, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016 (Nov. 13, 2016), XP051175509, 3 pages, Retrieved from the Internet: URL:http://www.3gpp.org/ftp/Meetings_3GPP_SYNC/RAN1/Docs/ [retrieved on Nov. 13, 2016].
International Search Report and Written Opinion—PCT/US2018/017644—ISA/EPO—dated Jul. 27, 2018.
(Continued)

*Primary Examiner* — Curtis A Alia
(74) *Attorney, Agent, or Firm* — Harrity & Harrity, LLP

(57) ABSTRACT

A method, an apparatus, and a computer program product for wireless communication are provided. The apparatus may determine whether traffic received by the wireless communication device is associated with a first type of hybrid automatic repeat request (HARQ) process or a second type of HARQ process, and/or may allocate a sub-buffer for the traffic, wherein the sub-buffer is selected from a set of sub-buffers of a first size when the traffic is associated with the first type of HARQ process, wherein the sub-buffer is selected from a set of sub-buffers of a second size when the traffic is associated with the second type of HARQ process, and wherein at least one sub-buffer of the first size includes two or more sub-buffers of the second size.

30 Claims, 15 Drawing Sheets

(52) U.S. Cl.
CPC .......... *H04L 1/1861* (2013.01); *H04L 1/1887* (2013.01); *H04L 1/1896* (2013.01); *H04L 49/9052* (2013.01); *H04W 72/0446* (2013.01); *H04L 1/1812* (2013.01)

(56) References Cited

U.S. PATENT DOCUMENTS

| | | |
|---|---|---|
| 2006/0092972 A1 | 5/2006 | Petrovic et al. |
| 2012/0275397 A1* | 11/2012 | Hsieh .................... H04L 1/1812 370/329 |
| 2015/0139155 A1* | 5/2015 | Wang .................... H04L 1/1812 370/329 |
| 2016/0204907 A1 | 7/2016 | Chen et al. |
| 2017/0063514 A1 | 3/2017 | Chen et al. |
| 2017/0126367 A1 | 5/2017 | Gao et al. |

OTHER PUBLICATIONS

Nokia et al., "On HARQ Process Handling for Shortened TTI", 3GPP Draft; R1-1702009, 3rd Generation Partnership Project (3GPP), Mobile Competence Centre; 650, Route Des Lucioles; F-86921 Sophia-Antipolis Cedex; France, vol. RAN WG1, No. Athens, Greece; Feb. 13, 2017-Feb. 17, 2017, Feb. 6, 2017 (Feb. 6, 2017), XP051220293,4 pages, Retrieved from the Internet: URL:http://www.3gpp.org/ftp/tsg_ran/WG1 RL1/TSGR1_88/Docs/ [retrieved on Feb. 6, 2017].
Partial International Search Report—PCT/US2018/017644—ISA/EPO—dated Jun. 4, 2018.

\* cited by examiner

HYBRID AUTOMATIC REPEAT REQUEST MANAGEMENT FOR DIFFERING TYPES OF HYBRID AUTOMATIC REPEAT REQUEST PROCESSES

CROSS-REFERENCE TO RELATED APPLICATIONS UNDER 35 U.S.C. § 119

This application claims priority to Provisional Patent Application No. 62/457,804, filed Feb. 10, 2017, entitled HYBRID AUTOMATIC REPEAT REQUEST MANAGEMENT FOR DIFFERING TYPES OF HYBRID AUTOMATIC REPEAT REQUEST PROCESSES," which is hereby expressly incorporated by reference herein.

BACKGROUND

Field

Aspects of the present disclosure generally relate to wireless communication, and more particularly to techniques and apparatuses for hybrid automatic repeat request (HARQ) management for differing transmission time intervals (TTIs).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In an aspect of the disclosure, a method, an apparatus, a wireless communication device, and a non-transitory computer-readable medium are provided.

In some aspects, the method may include determining, by a wireless communication device, whether traffic received by the wireless communication device is associated with a first type of HARQ process or a second type of HARQ process, and/or allocating, by the wireless communication device, a sub-buffer for the traffic, wherein the sub-buffer is selected from a set of sub-buffers of a first size when the traffic is associated with the first type of HARQ process, wherein the sub-buffer is selected from a set of sub-buffers of a second size when the traffic is associated with the second type of HARQ process, and wherein at least one sub-buffer of the first size includes two or more sub-buffers of the second size.

In some aspects, the wireless communication device may include a memory and at least one processor coupled to the memory. The memory and the at least one processor may be configured to determine whether traffic received by the wireless communication device is associated with a first type of HARQ process or a second type of HARQ process, and/or may allocate a sub-buffer for the traffic, wherein the sub-buffer is selected from a set of sub-buffers of a first size when the traffic is associated with the first type of HARQ process, wherein the sub-buffer is selected from a set of sub-buffers of a second size when the traffic is associated with the second type of HARQ process, and wherein at least one sub-buffer of the first size includes two or more sub-buffers of the second size.

In some aspects, the apparatus may include means for determining whether traffic received by the apparatus is associated with a first type of HARQ process or a second type of HARQ process, and/or means for allocating a sub-buffer for the traffic, wherein the sub-buffer is selected from a set of sub-buffers of a first size when the traffic is associated with the first type of HARQ process, wherein the sub-buffer is selected from a set of sub-buffers of a second size when the traffic is associated with the second type of HARQ process, and wherein at least one sub-buffer of the first size includes two or more sub-buffers of the second size.

In some aspects, the non-transitory computer-readable medium may store one or more instructions for wireless communication, the one or more instructions may include one or more instructions that, when executed by one or more processors of a wireless communication device, cause the one or more processors to determine whether traffic received by the wireless communication device is associated with a first type of HARQ process or a second type of HARQ process, and/or allocate a sub-buffer for the traffic, wherein the sub-buffer is selected from a set of sub-buffers of a first size when the traffic is associated with the first type of HARQ process, wherein the sub-buffer is selected from a set of sub-buffers of a second size when the traffic is associated with the second type of HARQ process, and wherein at least one sub-buffer of the first size includes two or more sub-buffers of the second size.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
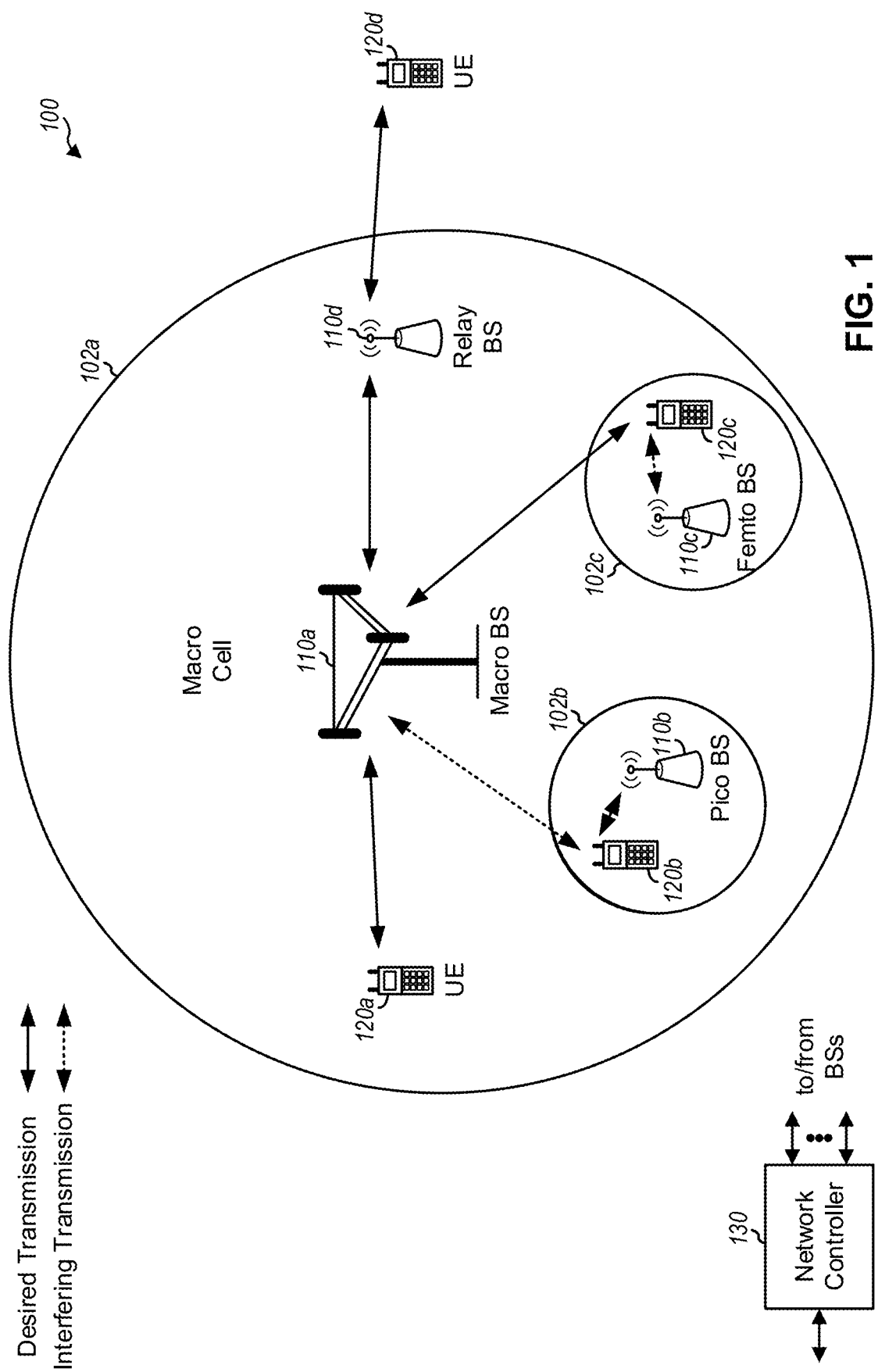
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point (AP) may comprise, be implemented as, or known as a NodeB, a Radio Network Controller (RNC), an eNodeB (eNB), a Base Station Controller (BSC), a Base Transceiver Station (BTS), a Base Station (BS), a Transceiver Function (TF), a Radio Router, a Radio Transceiver, a Basic Service Set (BSS), an Extended Service Set (ESS), a Radio Base Station (RBS), a Node B (NB), a gNB, a 5G NB, a NR BS, a Transmit Receive Point (TRP), or some other terminology.

An access terminal (AT) may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol (SIP) phone, a wireless local loop (WLL) station, a personal digital assistant (PDA), a tablet, a netbook, a smartbook, an ultrabook, a handheld device having wireless connection capability, a Station (STA), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
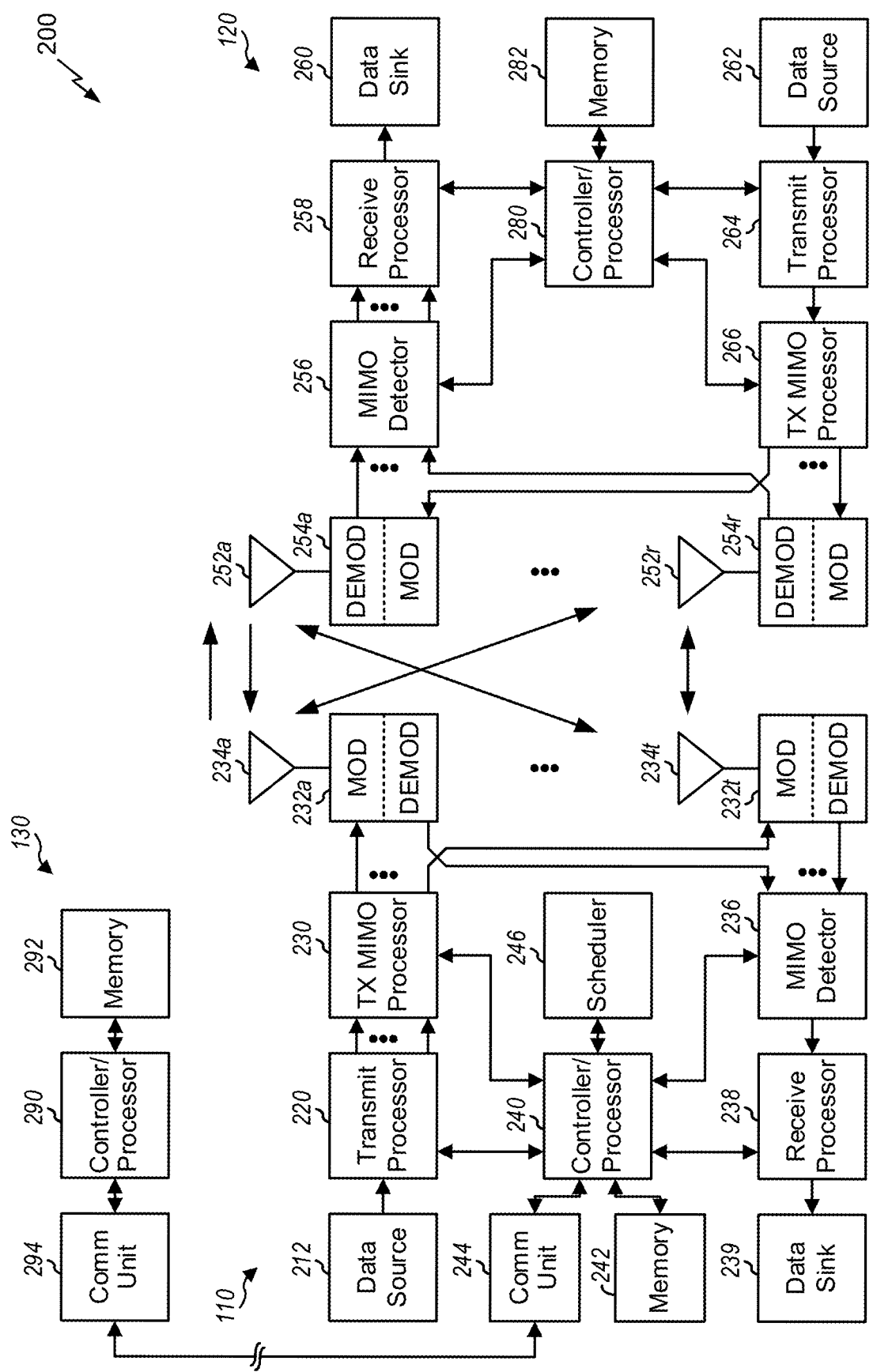
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120.

Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to perform HARQ management for differing TTIs. For example, controller/processor 280 and/or other processors and modules at base station 110, may perform or direct operations of UE 120 to perform HARQ management for differing TTIs. For example, controller/processor 280 and/or other controllers/processors and modules at BS 110 may perform or direct operations of, for example, method 1200 of FIG. 12, and/or other processes as described herein. In some aspects, one or more of the components shown in FIG. 2 may be employed to perform example method 1200 of FIG. 12, and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
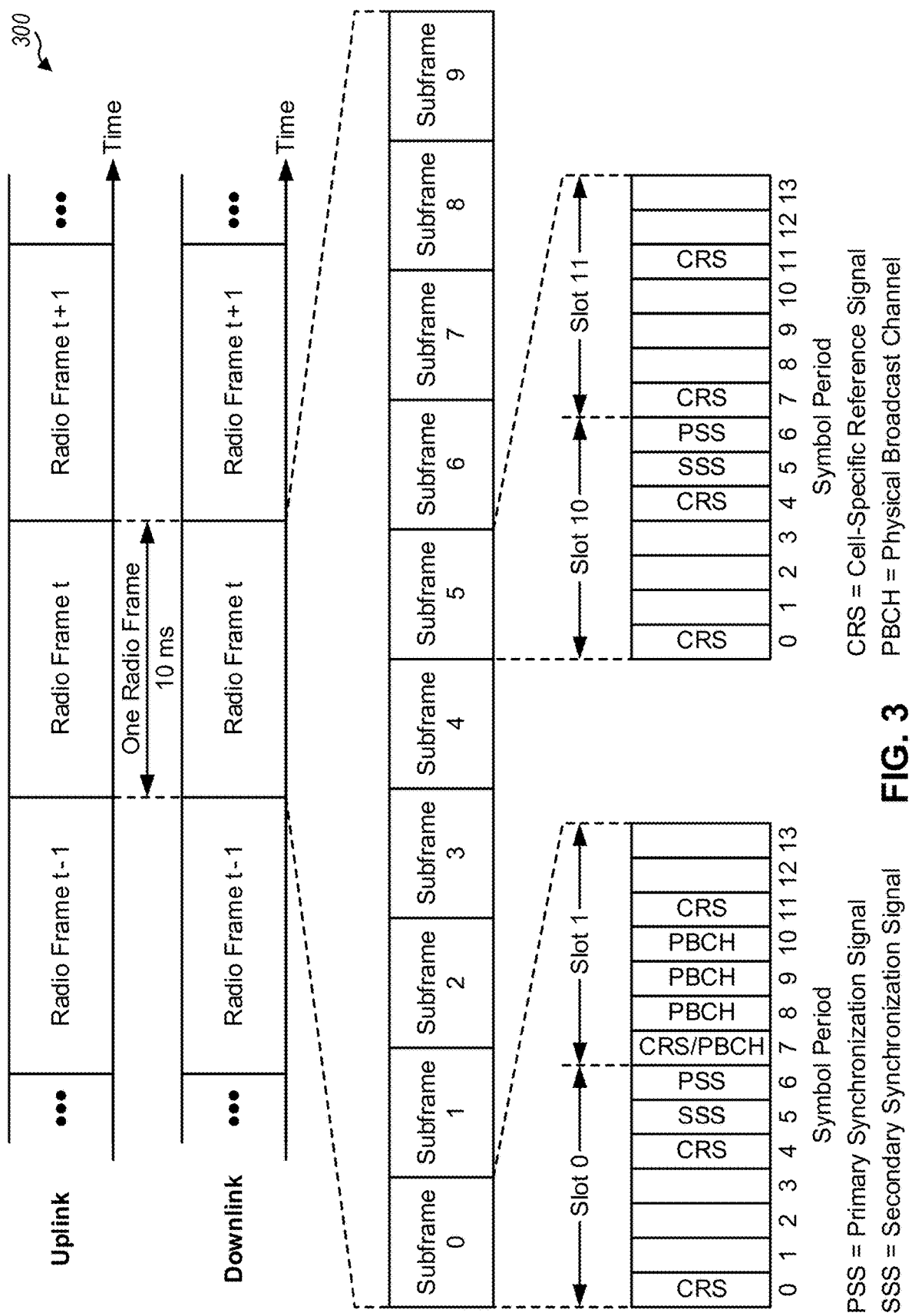
FIG. 3 is a diagram illustrating an example of a frame structure in a wireless communication network.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
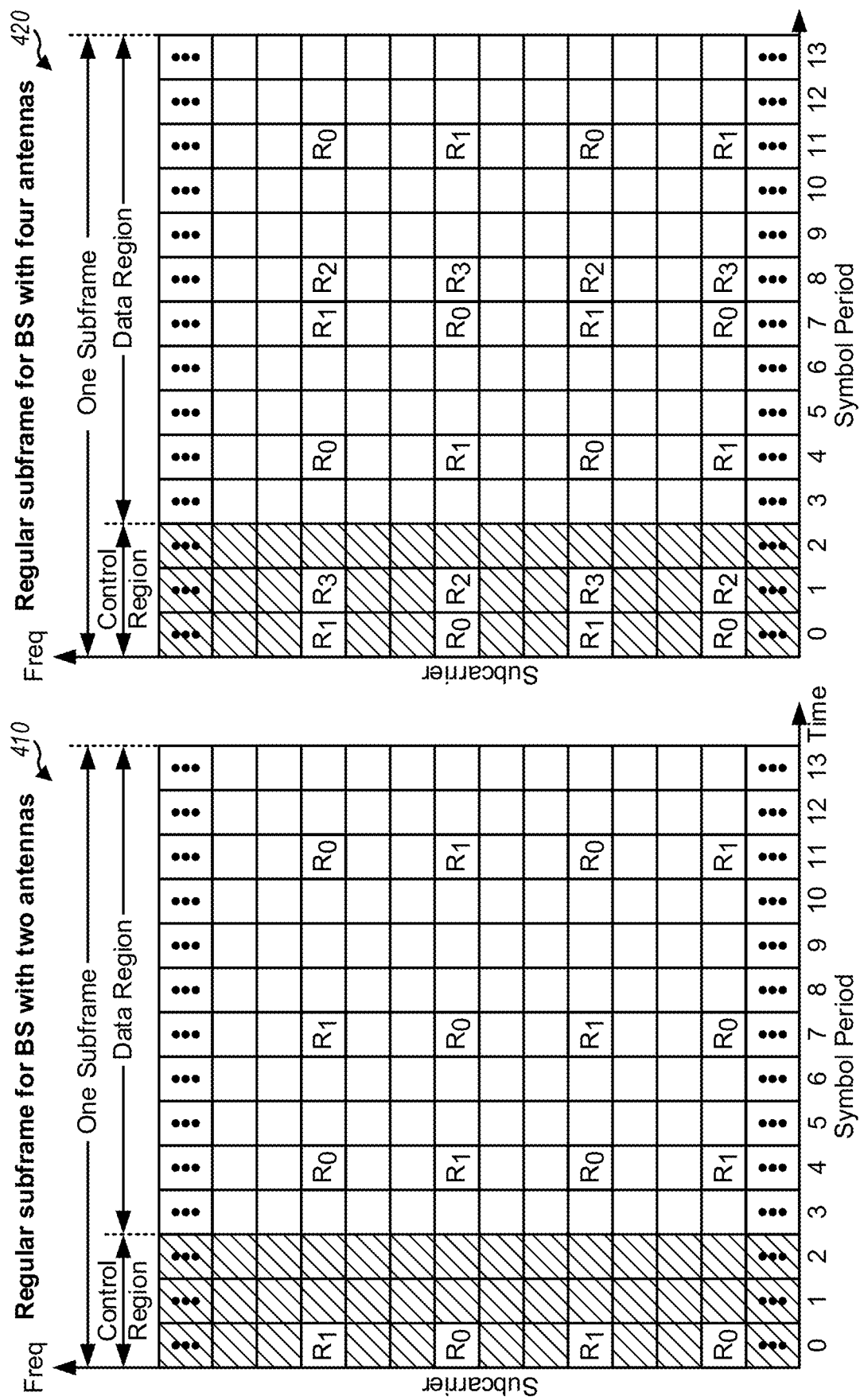
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where q∈{0, . . . Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type.

Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
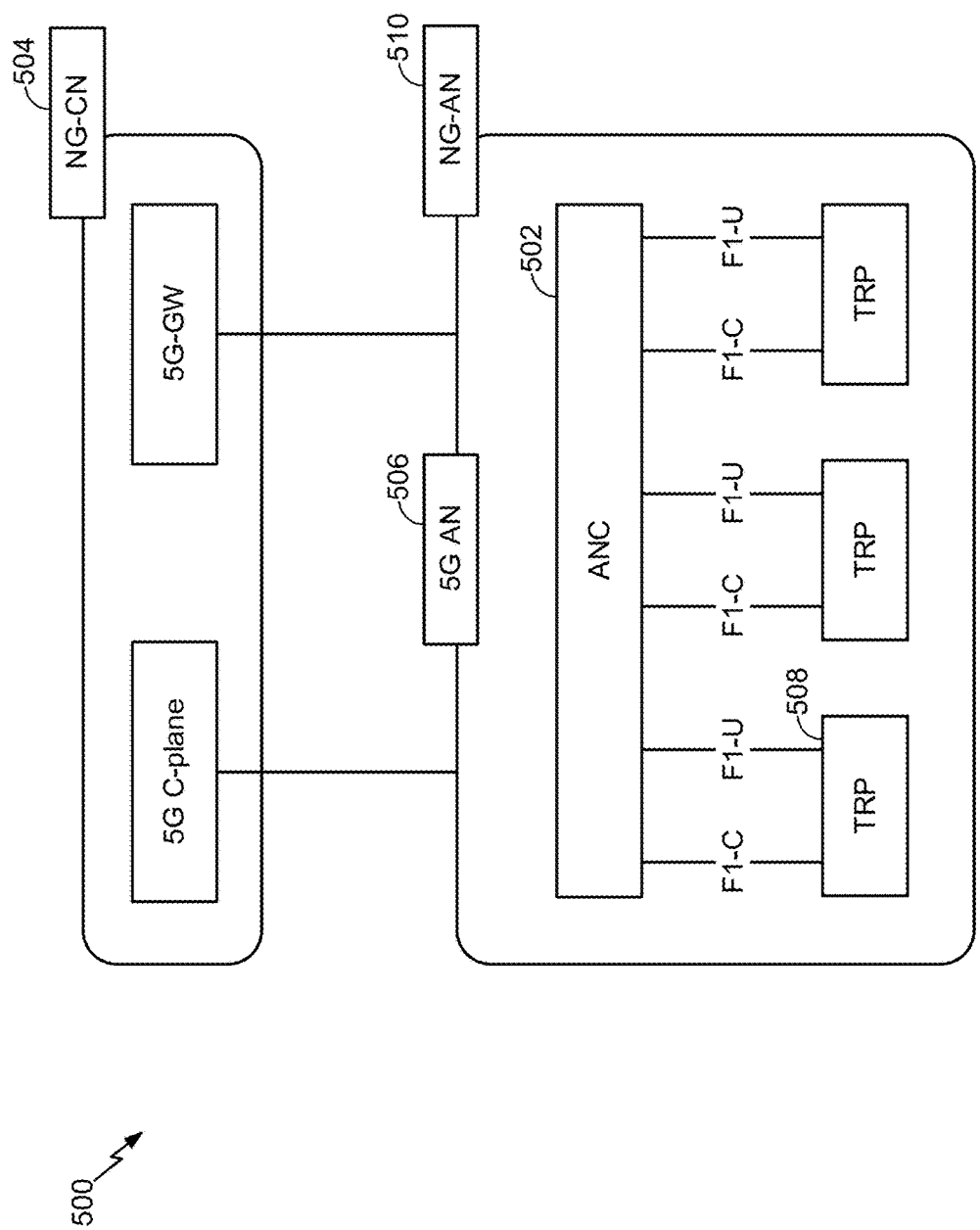
FIG. 5 is a diagram illustrating an example logical architecture of a distributed radio access network (RAN).

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
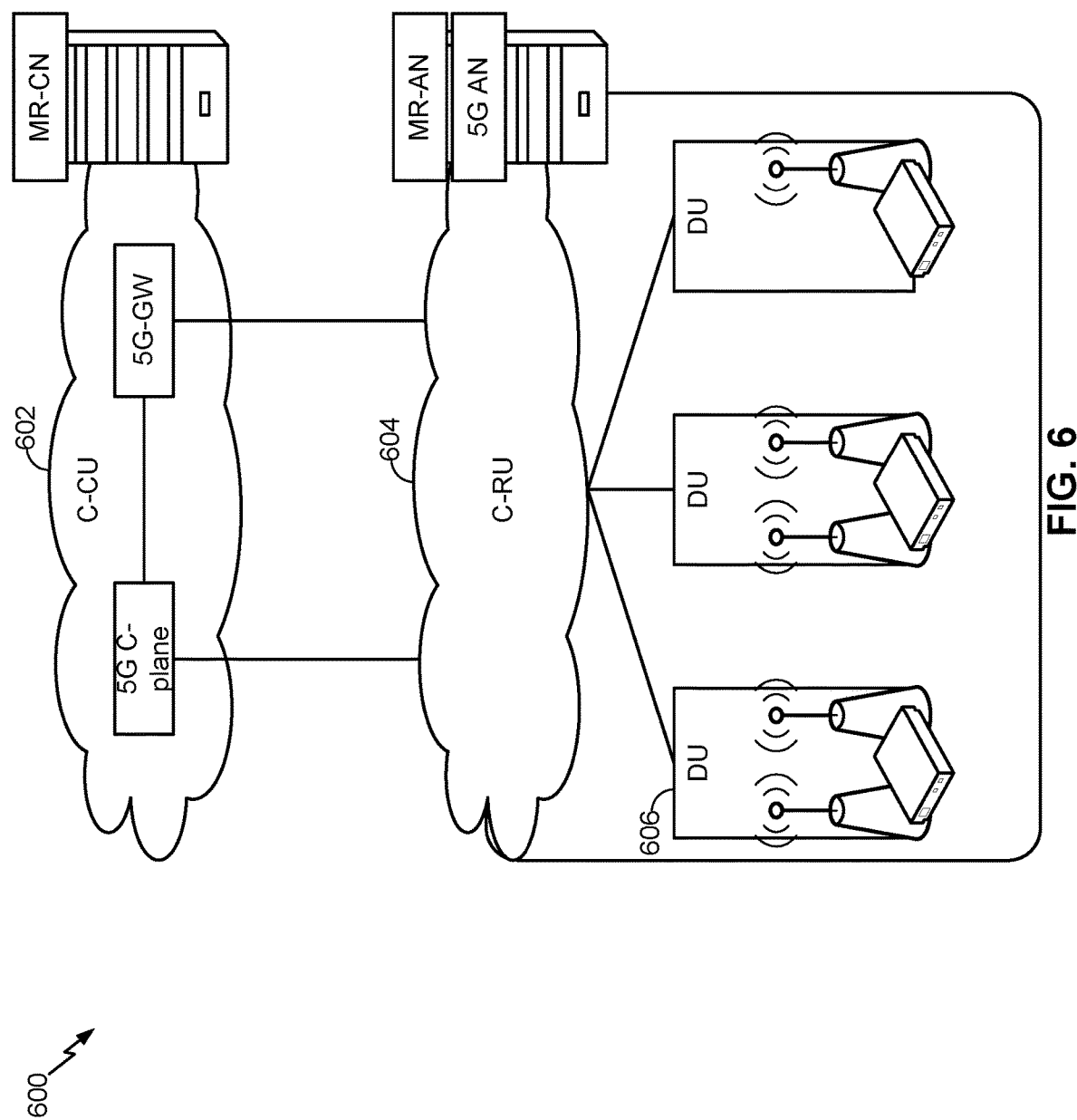
FIG. 6 is a diagram illustrating an example physical architecture of a distributed RAN.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
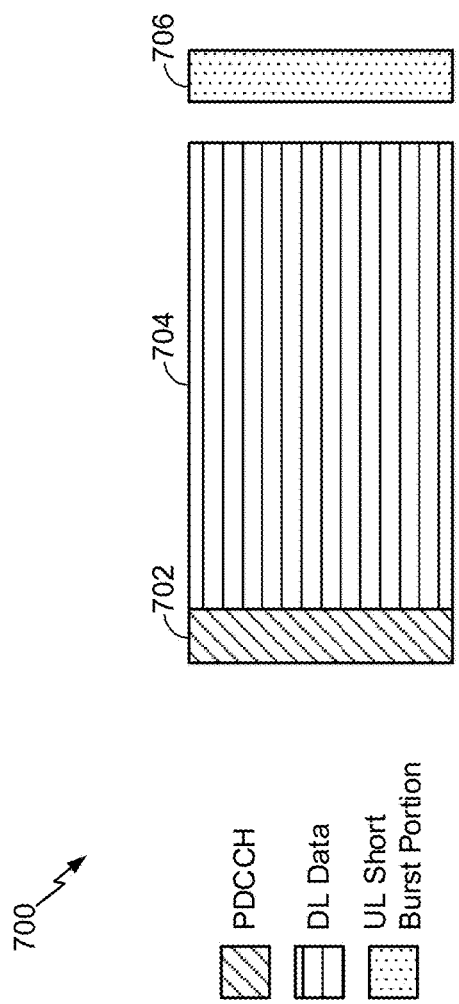
FIG. 7 is a diagram illustrating an example of a downlink (DL)-centric wireless communication structure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a physical uplink control channel (PUCCH) ACK, a physical uplink shared channel (PUSCH) ACK, an immediate ACK), a non-acknowledgment (NACK) signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
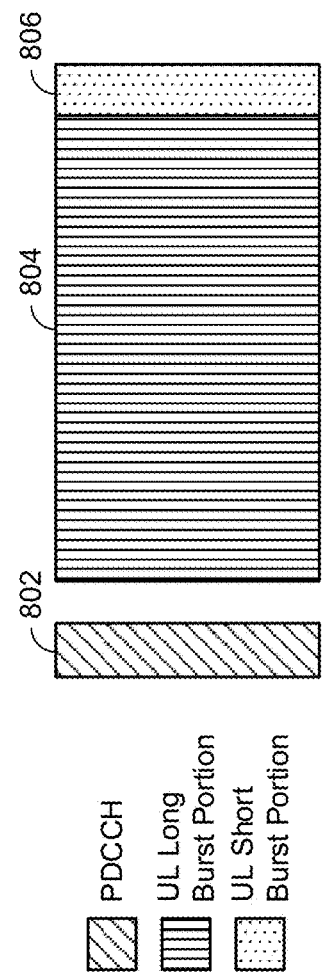
FIG. 8 is a diagram illustrating an example of an uplink (UL)-centric wireless communication structure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. In some configurations, the control portion 802 may be a physical DL control channel (PDCCH).

The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

In wireless communication systems, the data associated with one or more received communications may be stored in soft buffer memory. The soft buffer memory stores soft information associated with received bits, which are also referred to as soft bits. The soft information for a received bit may contain information about the most likely value of the bit and a measure of its reliability. The term "soft information" or "soft bit" generally refers to not making a hard decision about the value of a bit during demodulation and/or input to a decoder. These measures of reliability can be used in special soft decision decoders (e.g., Turbo decoders) to enhance decoding performance. For example, a decoded received packet and its supporting data (e.g., soft bits) are generally stored in soft buffer memory to accommodate combining the data with retransmitted data in the event that a determination is made that the communication was received in error for a previous transmission or previous retransmission. In a hybrid automatic retransmit request (HARQ) scheme, the receiver may request retransmission of a communication (or part of the communication), if the communication is not received correctly. At the receiver, the retransmitted communication may be combined with the originally received communication before decoding.

Portions of the soft buffer, which are referred to herein as sub-buffers, may be assigned for downlink traffic. For example, each downlink data channel (e.g., PDSCH and/or the like), of a wireless communication device (e.g., UE 120 of FIG. 1), may be allocated a respective sub-buffer (e.g., based at least in part on HARQ identifiers associated with each downlink data channel). Allocating the sub-buffers may be straightforward when each downlink data channel is associated with the same numerology or TTI length, as in, for example, an LTE RAT. However, as traffic complexity increases and new RATs are implemented (e.g., with ultra low latency communication (ULL), ultra-reliable low latency communication (URLLC), enhanced mobile broadband (eMBB) communications, NR, and/or the like), more various numerologies may be used.

When a wireless communication device uses multiple, different TTI lengths and a single sub-buffer size, it may be difficult to efficiently allocate sub-buffers. For example, the wireless communication device could apportion an entire sub-buffer to traffic associated with a shorter TTI, as well as to traffic associated with a longer TTI, but this may lead to throughput reduction of the wireless communication device and inefficient usage of the soft buffer. Another option is to increase the size of the soft buffer, thus generating more sub-buffers, but this may be costly and difficult to implement. A third option is to reconfigure indexing of the soft buffer according to traffic needs using a higher-layer logic (e.g., radio resource control (RRC) logic, etc.), but this may be time-consuming.

Some techniques and apparatuses, described herein, may allocate sub-buffers of at least two different sizes based at least in part on TTI lengths of traffic for which the sub-buffers are allocated. Furthermore, when the sub-buffers include larger sub-buffers (e.g., corresponding to a legacy TTI length, such as 1 ms LTE TTIs) and smaller sub-buffers (e.g., corresponding to low-latency communications, such as one-slot TTIs), one or more of the larger sub-buffers may include two or more of the smaller sub-buffers. That is, the larger sub-buffers may overlap the smaller sub-buffers.

A UE may selectively allocate the larger sub-buffers and the smaller sub-buffers based at least in part on traffic received by the UE. For example, when the traffic is associated with a legacy HARQ process, such as LTE traffic, the UE may allocate the larger sub-buffer. When the traffic is associated with another HARQ process, such as an ULL HARQ process, the UE may allocate a smaller sub-buffer included in the larger sub-buffer. Furthermore, the UE may dynamically allocate portions of the soft buffer (e.g., larger sub-buffers and/or smaller sub-buffers) according to types of HARQ processes associated with received traffic. For example, a larger sub-buffer may be allocated as two or more smaller sub-buffers when the larger sub-buffer is no longer needed, and/or when traffic associated with the larger sub-buffer is dropped for traffic associated with the smaller sub-buffers. Thus, utilization of the soft buffer of the UE is improved and downlink throughput of the UE is increased without increasing a size of the soft buffer. Furthermore, the UE takes into account that HARQ processes with shorter TTIs have smaller transport block sizes, and accordingly uses only the portion of the soft buffer that is needed for the smaller transport block sizes.

While aspects described herein are primarily described in the context of a UE being the receiver for the purpose of the HARQ processes, aspects described herein are not so limited. For example, aspects described herein may be applied using a base station as the receiver, and having a UE or another base station as a corresponding transmitter. Furthermore, while the examples described herein focus on ULL and LTE, aspects described herein also apply to other combinations of technologies and/or RATs, such as eMBB and URLLC in NR, NR and LTE, and/or other combinations.

Figure 9:
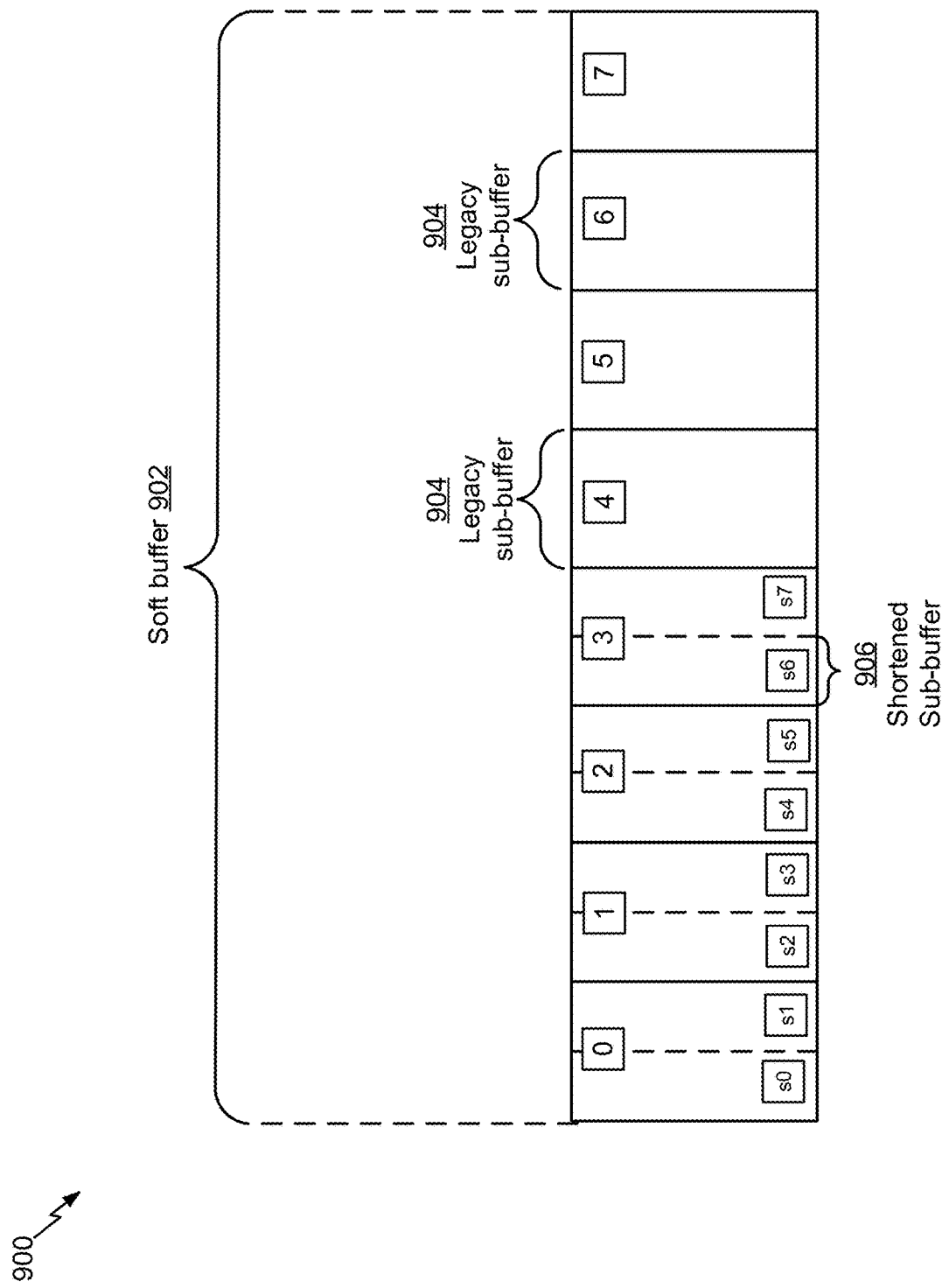
FIG. 9 is a diagram illustrating an example of a soft buffer of a UE, as allocated into overlapping larger sub-buffers and smaller sub-buffers.

FIG. 9 is a diagram illustrating an example 900 of a soft buffer of UE 120, as allocated into overlapping larger sub-buffers and smaller sub-buffers. As shown, a UE 120 may be associated with a soft buffer 902. The soft buffer 902 may include sub-buffers. For example, as shown by reference number 904, the soft buffer 902 may include eight larger sub-buffers. Here, the larger sub-buffers are referred to as legacy sub-buffers. For example, the larger sub-buffers may be associated with a HARQ process having a TTI length of 1 ms corresponding to LTE.

As shown by reference number 906, the soft buffer 902 may include smaller sub-buffers associated with a HARQ process having a TTI length shorter than 1 ms. For example, legacy sub-buffers with indexes 0 through 3 each may include two smaller or shortened sub-buffers. In some aspects, the larger sub-buffers may include a different quantity of smaller sub-buffers. For example, the ratio of smaller sub-buffers to larger sub-buffers may be based at least in part on a quantity of symbols included in TTIs of the larger sub-buffers and of the smaller sub-buffers. As a more particular example, an LTE HARQ sub-buffer (including two slots of seven symbols each) may include two low latency communication (LLC) HARQ sub-buffers (including one slot each) or six two-symbol HARQ sub-buffers.

In some aspects, the smaller sub-buffers may be included in a different set of larger sub-buffers than the first four contiguous larger sub-buffers. For example, the smaller sub-buffers may be included in any (or all) larger sub-buffer of the soft buffer 902. In some aspects, the soft buffer 902 may include a different quantity of sub-buffers. For example, the quantity of sub-buffers may be proportionate to a HARQ delay configuration. Additionally, or alternatively, the soft buffer needed for each HARQ processes may be proportional to the TTI length.

The UE 120 may assign index values to the larger sub-buffers and the smaller sub-buffers. For example, the larger sub-buffers may be assigned index values of 0 through 7, and the smaller sub-buffers may be assigned index values of s0 through s7. Thus, a BS 110 that transmits downlink traffic to the UE 120 may use a 3-bit HARQ identifier to identify the HARQ process associated with the downlink traffic, irrespective of whether the HARQ process is to use a larger sub-buffer or a smaller sub-buffer. In some aspects, the number of bits (or a number of HARQ processes or sub-buffers) may be determined based at least in part a maximum value of a number of HARQ processes for the shorter TTI or a number of HARQ processes for the longer TTI.

In this way, configuration of BS 110 is simplified and communications between BS 110 and UE 120 are simplified. In some aspects, as described in more detail in connection with FIG. 10 below, the UE 120 may determine whether the downlink traffic is to be allocated a larger sub-buffer or a smaller sub-buffer based at least in part on downlink control information associated with the downlink traffic. Thus, resources of BS 110 that would otherwise be used to specify whether the downlink traffic is to be allocated a larger sub-buffer or a smaller sub-buffer are conserved.

In some aspects, the sub-buffers may be mapped to downlink channels. For example, the UE 120 may map the sub-buffers to the downlink channels based at least in part on respective HARQ identifiers of the downlink channels (e.g., HARQ ID 0 may be mapped to sub-buffer 0 or s0). In some aspects, the mapping of the sub-buffers may not be in a contiguous or continuous order with regard to the HARQ identifiers. For example, any one-to-one mapping of sub-buffers to HARQ identifiers may be configured.

As indicated above, FIG. 9 is provided as an example. Other examples are possible and may differ from what was described with respect to FIG. 9.

Figure 10A:
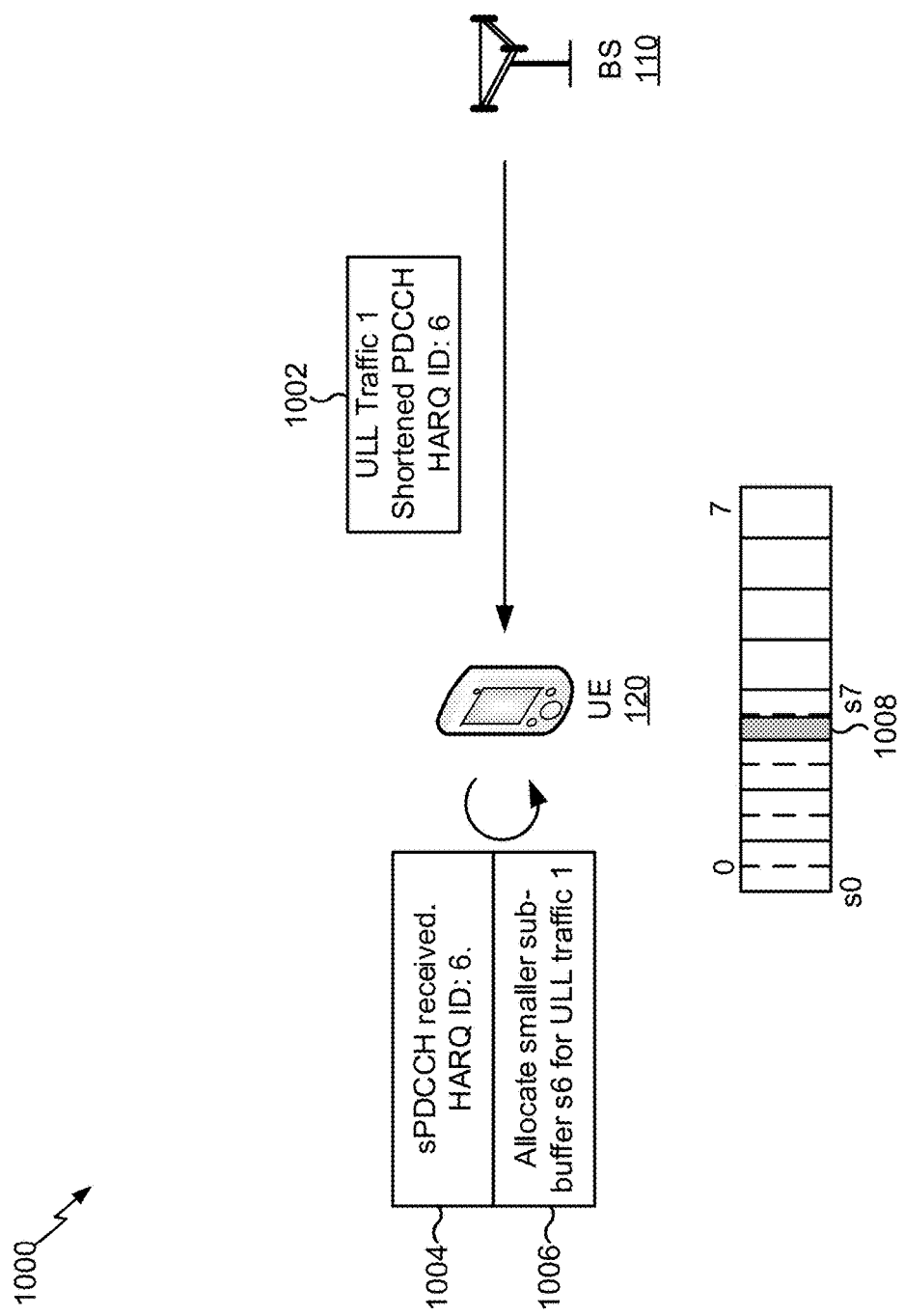
FIGS. 10A and 10B are diagrams illustrating examples of HARQ management for differing types of HARQ processes.
Figure 10B:
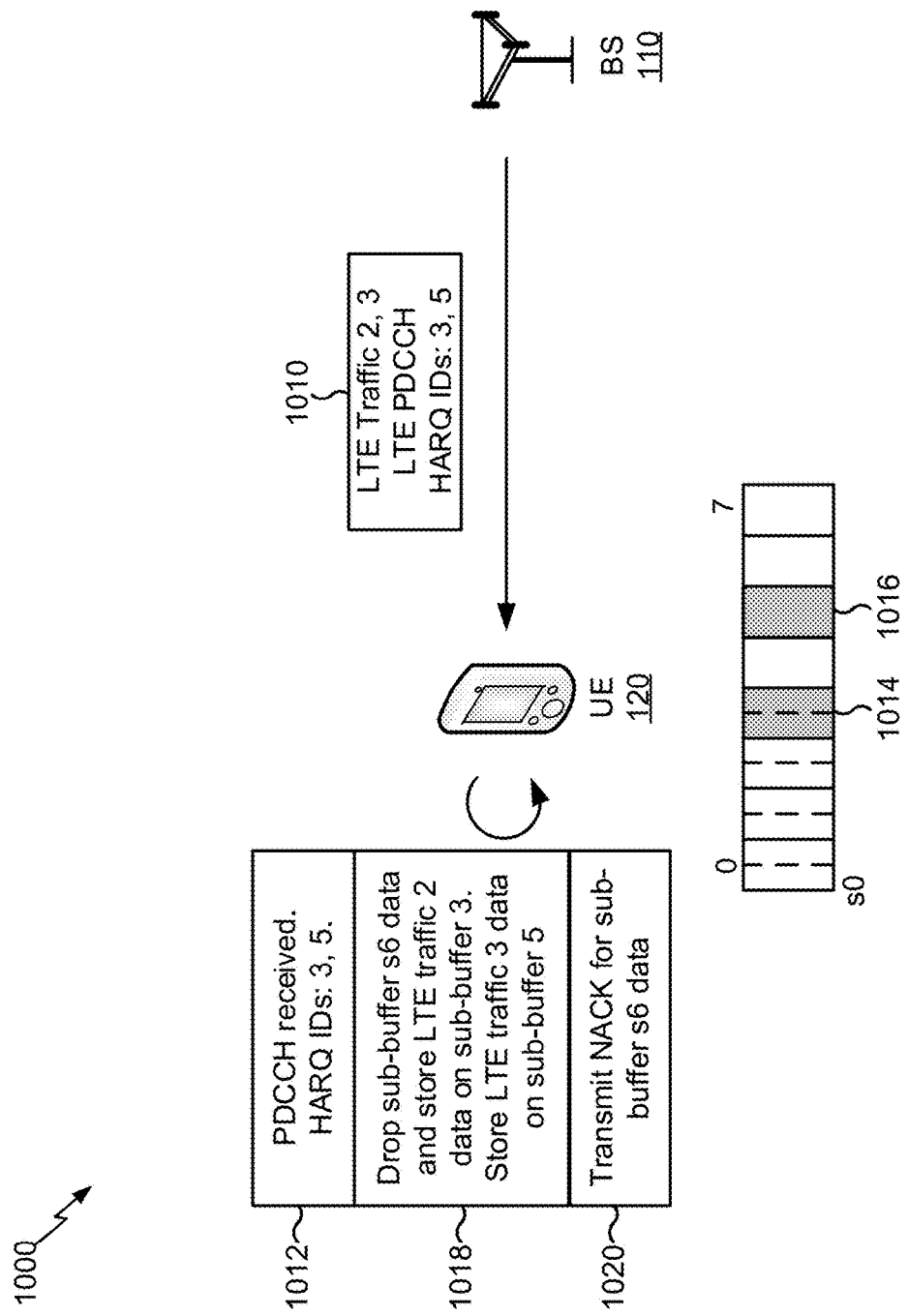

FIGS. 10A and 10B are diagrams illustrating examples 1000 of HARQ management for differing types of HARQ processes, in accordance with various aspects of the present disclosure.

As shown in FIG. 10A, and by reference number 1002, a BS 110 may transmit downlink control information (e.g., a shortened PDCCH, referred to as sPDCCH) for first traffic (e.g., ULL traffic 1). For example, the BS 110 may provide the first traffic on a downlink channel (e.g., a shortened PDSCH, referred to as sPDSCH) associated with a HARQ identifier of 6. The downlink control information for scheduling the first traffic may identify the downlink channel and the corresponding HARQ identifier. For example, the HARQ identifier may be identified using a three-bit value, since the soft buffer of UE 120 includes eight larger sub-buffers and eight smaller sub-buffers.

As shown by reference number 1004, the UE 120 may receive the downlink control information. The UE may determine that the downlink control information is associated with a type of HARQ process having a shorter TTI corresponding to a smaller sub-buffer size. For example, the ULL traffic on the downlink may use a one-slot TTI. For the purpose of FIGS. 10A and 10B, assume that the shorter TTI length and smaller sub-buffer size correspond to ULL traffic, and that a longer TTI and a longer sub-buffer size correspond to LTE traffic.

As shown by reference number 1006, the UE 120 may allocate a sub-buffer s6 for the first traffic. The UE 120 may allocate the sub-buffer s6, shown by reference number 1008, based at least in part on determining that the first traffic is associated with HARQ identifier 6 and determining that the first traffic is associated with downlink control information indicating that the first traffic is associated with a type of HARQ process having the shorter TTI (e.g., the sPDCCH). In this way, the UE 120 uses different index values for sub-buffers corresponding to shorter TTIs than for sub-buffers corresponding to longer TTIs, and permits the BS 110 to use the same formatting of HARQ identifier for both the shorter TTIs and the longer TTIs. Thus, in the case wherein both types of HARQ process have equal amounts of sub-buffers or HARQ processes, communication resources and configuration resources of the BS 110 and the UE 120 are saved relative to using different formatting of HARQ identifiers for shorter TTIs and longer TTIs.

As shown by reference number 1008, the UE 120 may store, at the sub-buffer s6, data associated with the first traffic. The data associated with the first traffic may include soft bit information, such as a best estimate of a value of the first traffic, a measure of the reliability of the best estimate, and/or the like. As further shown, the sub-buffer s6 may use approximately half of the buffer space of a sub-buffer associated with a longer TTI, such as sub-buffers 0 through 7. Thus, efficiency of utilization of the buffer is improved.

As shown in FIG. 10B, and by reference number 1010, the BS 110 may transmit downlink control information (e.g., an LTE PDCCH) for second and third traffic (e.g., LTE traffic 2 and LTE traffic 3). The second and third traffic may be different traffic than the first traffic. For example, the downlink control information for the second traffic and the third traffic may include a new data indicator (NDI) indicating that the transmission is not a retransmission of the first traffic. As further shown, the second traffic and the third traffic are LTE traffic, which may be associated with a type of HARQ process having a longer TTI of, for example, 1 ms. Further, the second traffic and the third traffic are associated with HARQ identifiers of 3 and 5, respectively, which may be identified by the downlink control information.

In some aspects (e.g., when cross-TTI combining is not allowed), the HARQ processes can be distinguished by the scheduling control type (e.g., PDCCH vs. sPDCCH). For example, the HARQ process ID 0, when scheduled by PDCCH, could be different from sPDCCH. When cross-TTI combining is allowed, then the HARQ process ID X (regardless of whether the HARQ process is scheduled by PDCCH or sPDCCH) refers to the same HARQ index.

As shown by reference number 1012, the UE 120 may receive the downlink control information. The UE 120 may determine, based at least in part on the HARQ identifiers of the downlink control information, that the second traffic and the third traffic are to be stored on sub-buffers 3 and 5, respectively. That is, the UE 120 may determine that data associated with the second traffic is to be stored in larger sub-buffer 3, shown by reference number 1014, which overlaps smaller sub-buffer s6, that was described in connection with FIG. 10A. Recall that smaller sub-buffer s6 stores soft information associated with the first traffic. Further, the UE 120 may determine that data associated with the third traffic is to be stored in larger sub-buffer 5, shown by reference number 1016, which overlaps no smaller sub-buffers.

In some aspects, if the first transmission uses a 1 ms TTI, the UE 120 may use one of the larger sub-buffers. If the same packet is sent via sTTI, the UE 120 can combine the two PDSCHs, and if the decoding again fails, the UE 120 may store the log likelihood ratios (LLRs) in a sub-buffer of the smaller size (e.g., because the packet that can be sent via sTTI needs a smaller buffer size).

As shown by reference number 1018, the UE 120 may drop the data stored in sub-buffer s6, and may store the second traffic (e.g., LTE traffic 2) in sub-buffer 3. For example, the UE 120 may determine that the data associated with the first traffic is to be dropped from smaller sub-buffer s6, and that the data associated with the second traffic is to be stored in larger sub-buffer 3, which includes smaller sub-buffer s6. The UE 120 may perform this determination based at least in part on priorities of the first traffic and the second traffic, a source of the first traffic and/or the second traffic, and/or the like. In some aspects, the UE 120 may perform this determination based at least in part on an amount of buffer space available. For example, if some other larger TTI buffers are free, the UE 120 may store the LLRs in other memory spaces, and may not flush sub-buffer s6. In some aspects, the HARQ process ID attachment to buffers is virtual, i.e., controlled by the UE.

In this way, buffer resources are dynamically reallocated for TTIs of different sizes, which improves versatility and throughput of the soft buffer without increasing a size of the soft buffer. In some aspects, if soft information was also stored on sub-buffer s7, the soft information on sub-buffer s7 may also be dropped to store the data associated with the second traffic. In some aspects, the UE 120 may drop the LTE traffic and continue storing the ULL traffic (e.g., based at least in part on the parameters described above). As further shown, the UE 120 may store the third traffic (e.g., LTE traffic 3) on sub-buffer 5.

As shown by reference number 1020, the UE 120 may transmit, to the BS 110, a non-acknowledgment (e.g., NACK) for the first traffic that was stored on sub-buffer s6. By transmitting the NACK, the UE 120 may cause the BS 110 to retransmit the first traffic. Thus, the UE 120 may successfully receive and decode the first traffic, despite dropping the stored soft information of the first traffic to store the soft information for the second traffic.

As indicated above, FIGS. 10A and 10B are provided as examples. Other examples are possible and may differ from what was described with respect to FIGS. 10A and 10B.

Figure 11A:
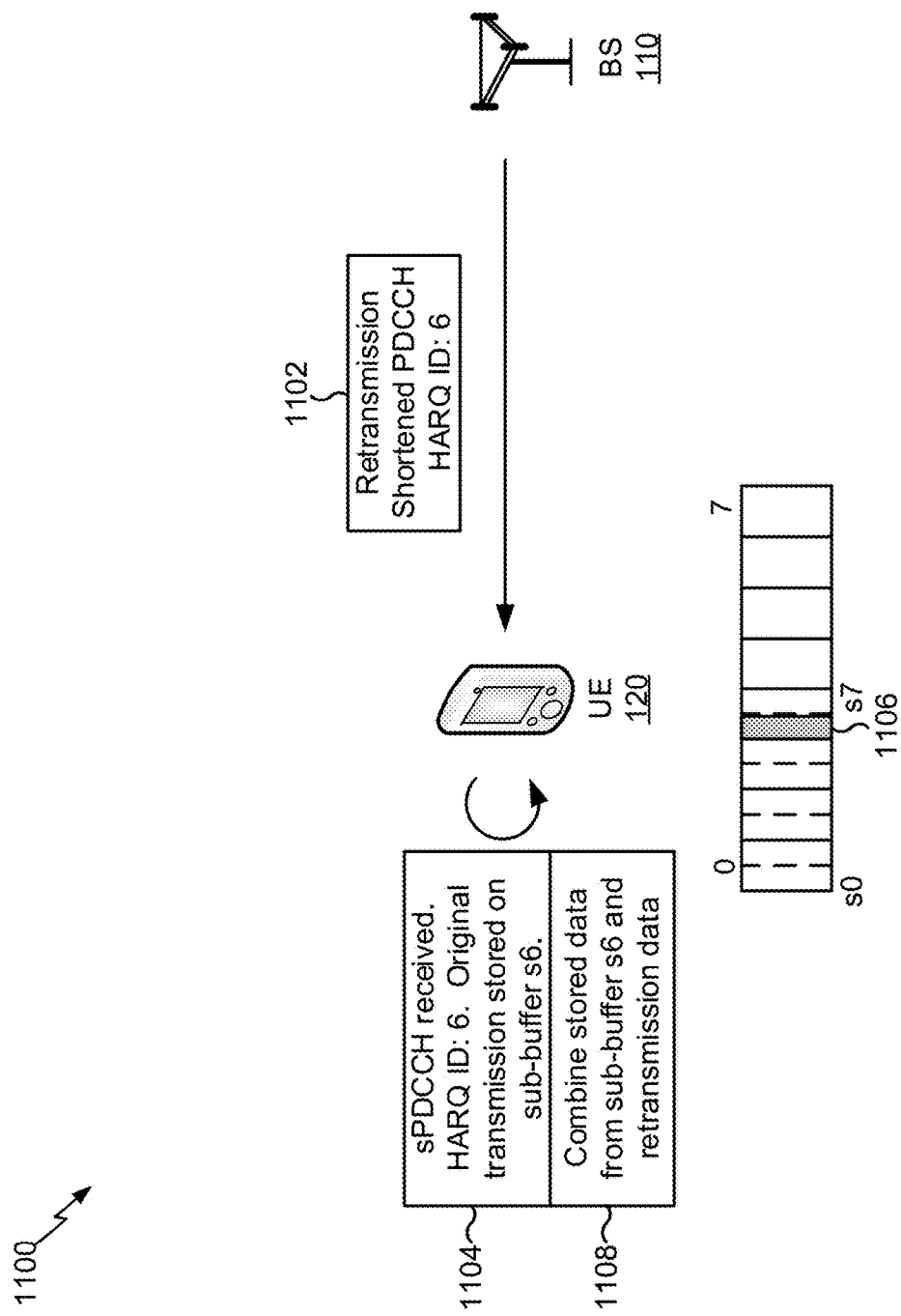
FIGS. 11A and 11B are diagrams illustrating examples of HARQ management for differing types of HARQ processes.
Figure 11B:
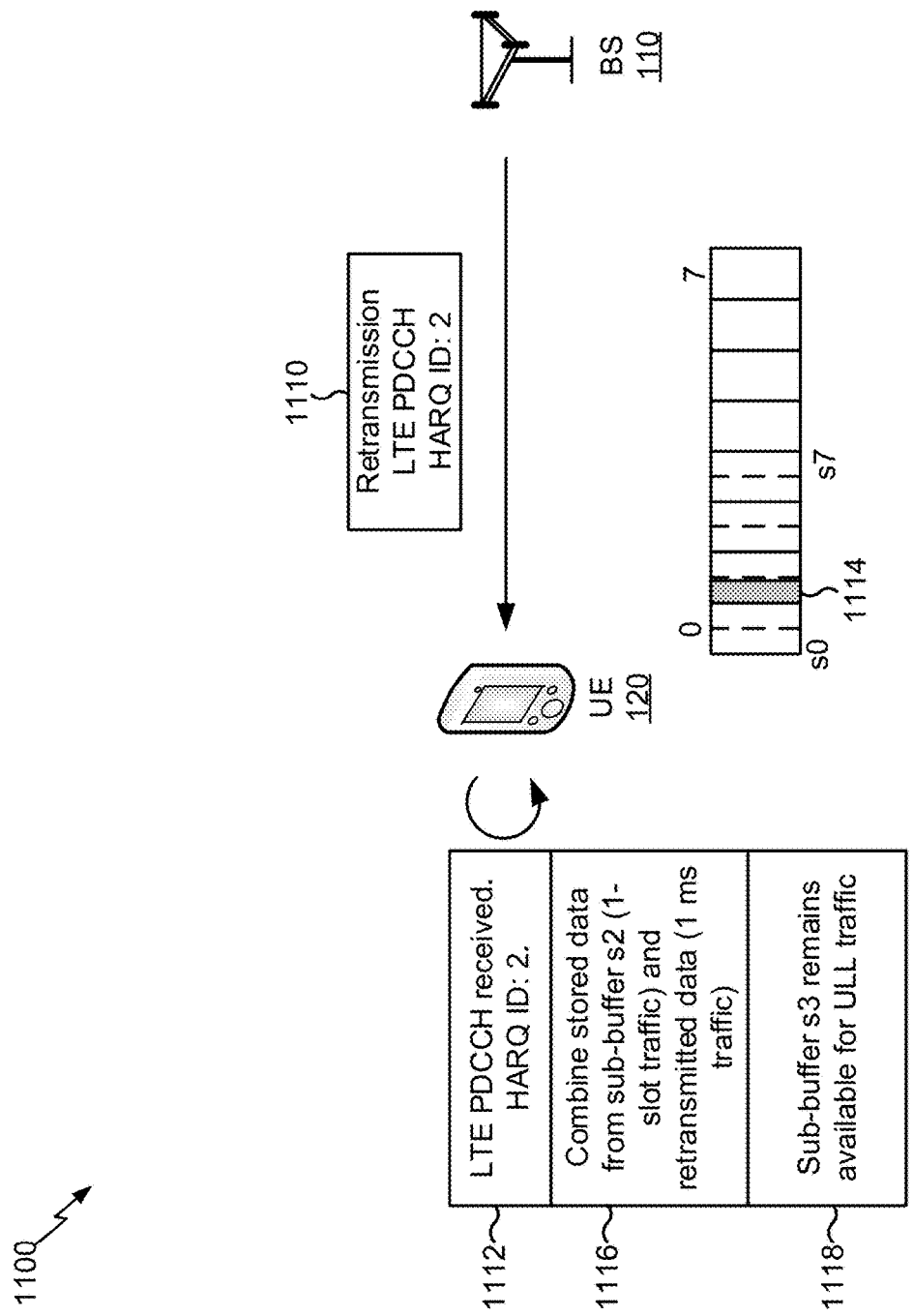

FIGS. 11A and 11B are diagrams illustrating examples 1100 of HARQ management for differing types of HARQ processes, in accordance with various aspects of the present disclosure. FIG. 11A shows an example of combining buffered information and retransmitted information associated with types of HARQ processes having the same TTI length, whereas FIG. 11B shows an example of combining buffered information and retransmitted information associated with types of HARQ processes having different TTI lengths. For the purpose of FIG. 11A, assume that a UE 120 has previously stored data associated with downlink traffic (e.g., soft bit information and/or the like) on sub-buffer s6.

As shown in FIG. 11A, and by reference number 1102, the UE 120 may receive a retransmission of the downlink traffic. The UE 120 may identify the retransmission as a retransmission based at least in part on a new data indicator included in the downlink traffic. For example, the UE 120 may have previously transmitted a NACK for the downlink traffic, and may have stored soft information for the downlink traffic on a sub-buffer corresponding to the HARQ ID of the downlink traffic (e.g., sub-buffer s6). The BS 110 may retransmit the downlink traffic based on the NACK, and may include a new data indicator indicating that the downlink traffic is a retransmission.

As shown by reference number 1104, the UE 120 may identify the retransmission as associated with the downlink traffic based at least in part on downlink control information indicating that the retransmission and the downlink traffic are associated with the same HARQ identifier. Further, the UE 120 may determine that soft information for the first transmission of the downlink traffic is stored on sub-buffer s6, shown by reference number 1106.

As shown by reference number 1108, the UE 120 may combine the stored data (e.g., the bit information from sub-buffer s6) and the retransmission data. For example, the UE 120 may perform a combination of soft information stored on sub-buffer s6 and the retransmission data to decode the downlink traffic. In this way, the UE 120 combines buffered information and retransmitted information, when the buffered information and the retransmitted information are associated with the same TTI length.

For the purpose of FIG. 11B, assume that data associated with a first transmission of traffic, associated with a one-slot TTI, is stored on sub-buffer s2. As shown in FIG. 11B, and by reference number 1110, the UE 120 may receive a retransmission of the traffic. As shown by reference number 1112, the UE 120 may determine, based on downlink control information, that the retransmission relates to the data stored on sub-buffer s2, shown by reference number 1114.

Further, the UE 120 may determine that the retransmission is associated with the first transmission based at least in part on the retransmission and the first transmission being associated with the same HARQ identifier, and based at least in part on a new data indicator of the downlink control information indicating that the retransmission is a retransmission, and not new information. If, on the other hand, the new data indicator indicated that the retransmission was new traffic, the UE 120 may drop one of the stored information on sub-buffer s2 or the new traffic.

As shown by reference number 1116, the UE 120 may combine the data stored on sub-buffer s2 (e.g., associated with the short TTI length) and the retransmitted data (e.g., associated with the long TTI length) to determine the traffic. Notably, the retransmission is associated with a different TTI length than the first transmission. In other words, aspects described herein are not limited to combining transmission of the same TTI length. By combining retransmissions of different TTI lengths, aspects described herein improve versatility of the soft buffer and give the BS 110 increased versatility to schedule downlink traffic as needed.

As shown by reference number 1118, sub-buffer s3 may remain available for buffering of traffic associated with short TTIs (e.g., ULL traffic and/or the like) as the soft information for the downlink traffic is stored on sub-buffer s2. In some aspects, the UE 120 may buffer the retransmission of the traffic (associated with the long TTI) on sub-buffer s2. For example, the retransmission may be equal in transport block size to the original transmission of the traffic stored on sub-buffer s2, even though the retransmission is transmitted using a longer TTI. Therefore, the retransmission may be stored on a shorter sub-buffer despite using a longer TTI. In this way, versatility of the soft buffer is further improved.

In some aspects, a retransmission may be associated with a type of HARQ process having a shorter TTI than an original transmission. In other words, aspects described herein are not limited to a retransmission having a longer TTI than an original transmission.

As indicated above, FIGS. 11A and 11B are provided as examples. Other examples are possible and may differ from what was described with respect to FIGS. 11A and 11B.

Figure 12:
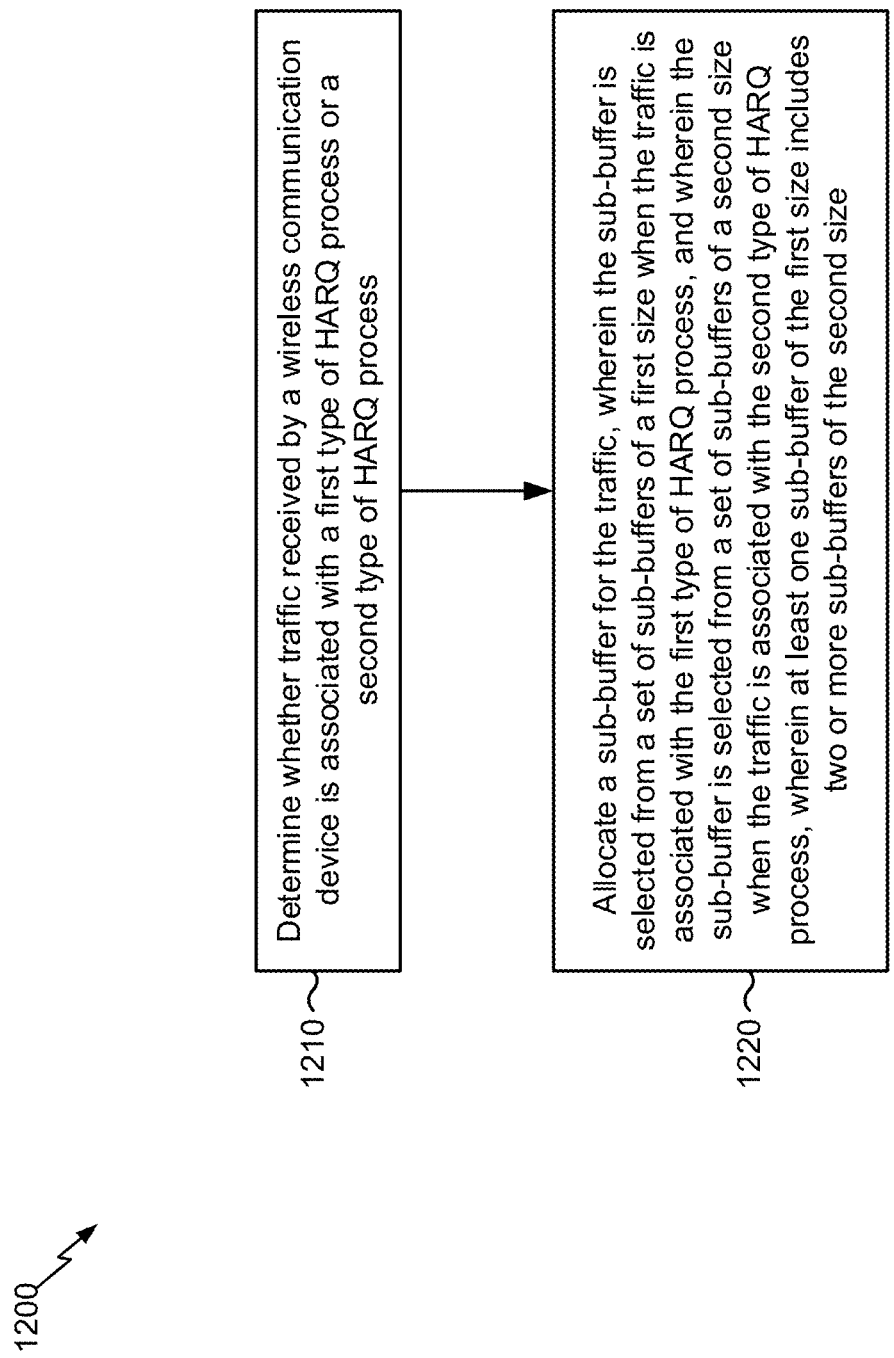
FIG. 12 is a flow chart of a method of wireless communication.

FIG. 12 is a flow chart of a method 1200 of wireless communication. The method may be performed by a wireless communication device (e.g., the UE 120 of FIG. 1, apparatus 1302 of FIG. 13, apparatus 1302' of FIG. 14, and/or the like).

At 1210, the wireless communication device may determine whether traffic received by the wireless communication device is associated with a first type of HARQ process or a second type of HARQ process. For example, the wireless communication device may determine whether downlink traffic received by the wireless communication device is associated with a first type of HARQ process (e.g., having a first TTI length) or a second type of HARQ process (e.g., having a second TTI length). The wireless communication device may perform this determination based at least in part on whether downlink control information scheduling the downlink traffic is associated with the first TTI length or the second TTI length.

At 1220, the wireless communication device may allocate a sub-buffer for the traffic, wherein the sub-buffer is selected from a set of sub-buffers of a first size when the traffic is associated with the first type of HARQ process, and wherein the sub-buffer is selected from a set of sub-buffers of a second size when the traffic is associated with the second type of HARQ process, wherein at least one sub-buffer of the first size includes two or more sub-buffers of the second size. For example, the wireless communication device may allocate a sub-buffer for the traffic. The sub-buffer may be selected from a set of sub-buffers of a first size when the traffic is associated with the first type of HARQ process (e.g., having the first TTI length). The sub-buffer may be selected from a set of sub-buffers of the second size when the traffic segment information associated with the second type of HARQ process (e.g., having the second TTI length). At least one sub-buffer of the first size may include two or more sub-buffers of the second size. For example, the sub-buffers of the second size may be included in one or more of the sub-buffers of the first size.

In some aspects, the sub-buffer size can be determined based on the TTI lengths of the initial transmission. If the TTI length is 1 ms TTI, the sub-buffer size may be based at least in part on TTI. If the TTI length is associated with sTTI, the sub-buffer size may be based at least in part on sTTI.

In some aspects, allocating the sub-buffer for the traffic may include allocating the sub-buffer based at least in part on a HARQ identifier associated with the traffic. In some aspects, the HARQ identifier may use a same format for the first type of HARQ process and for the second type of HARQ process.

In some aspects, the determination may be based at least in part on whether scheduling information for the traffic is associated with a first length TTI or a second length TTI, wherein the second length TTI is shorter than the first length TTI, and wherein the first length TTI corresponds to the first type of HARQ process and the second length TTI corresponds to the second type of HARQ process.

In some aspects, when the sub-buffer may store data associated with one or more other HARQ processes, the data may be dropped for the sub-buffer to be used for the traffic. In some aspects, the one or more other HARQ processes may be of the first type of HARQ process, and the traffic may be associated with the second type of HARQ process. In some aspects, the one or more other HARQ processes may include a set of HARQ processes of the second type of HARQ process, wherein data associated with the set of HARQ processes is dropped from the sub-buffer. In some aspects, the traffic may be associated with the first type of HARQ process. In some aspects, a NACK may be transmitted for the data associated with the one or more other HARQ processes.

In some aspects, the first type of HARQ process may be associated with a HARQ delay configuration of n+m and the second type of HARQ process may be associated with a HARQ delay configuration of n+p. The set of sub-buffers of the first size may include 2*m sub-buffers, and the set of sub-buffers of the second size may include 2*p sub-buffers.

In some aspects, the at least one sub-buffer of the first size may include a particular quantity of the sub-buffers of the second size, wherein the particular quantity may be based at least in part on a ratio of a quantity of symbols or slots of a TTI of the first type of HARQ process and a quantity of symbols or slots of a TTI of the second type of HARQ process.

In some aspects, a TTI of the first type of HARQ process may be a one millisecond TTI, and a TTI of the second type of HARQ process may include a two symbol based TTI or a slot based TTI.

In some aspects, the first type of HARQ process may be associated with a first length TTI and the second type of HARQ process may be associated with a second length TTI, wherein a transmission of the traffic is received via the second length TTI, and wherein a retransmission of the traffic is received via the first length TTI. In some aspects, the retransmission of the traffic may be allotted a sub-buffer of the second size based at least in part on the transmission of the traffic being received via the first length TTI. In some aspects, the sub-buffer may be a first sub-buffer, and a second sub-buffer may be allocated for other traffic of the second type of HARQ process, wherein the first sub-buffer and the second sub-buffer are included within a single sub-buffer of the first size.

In some aspects, the first type of HARQ process is associated with a first length TTI and the second type of HARQ process is associated with a second length TTI, a transmission of the traffic is received via the first length TTI, and a retransmission of the traffic is received via the second length TTI.

In some aspects, TTIs for the second type of HARQ process may be shorter than TTIs for the first type of HARQ process.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

Figure 13:
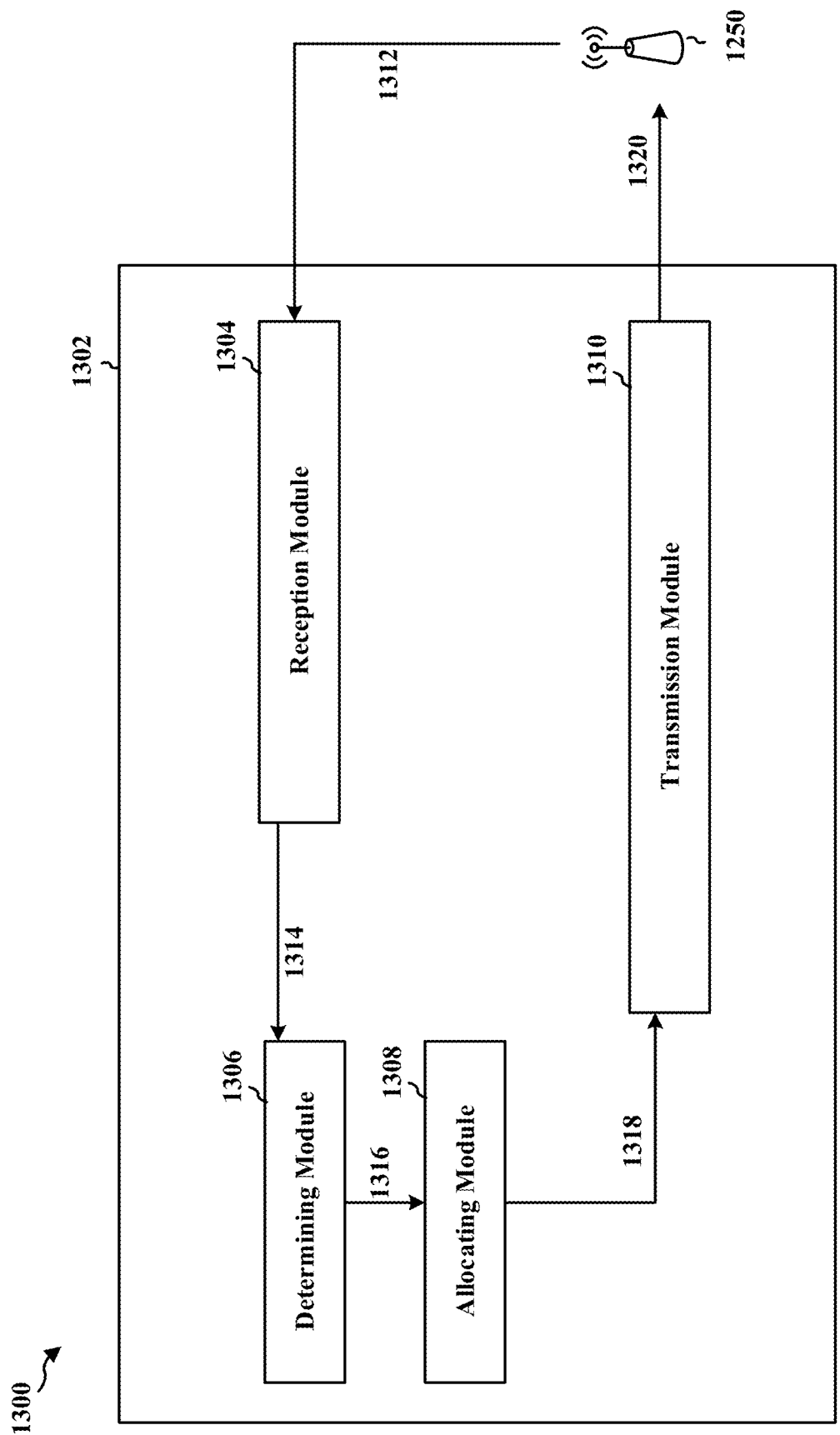
FIG. 13 is a conceptual data flow diagram illustrating the data flow between different modules/means/components in an example apparatus.

FIG. 13 is a conceptual data flow diagram 13 illustrating the data flow between different modules/means/components in an example apparatus 1302. The apparatus 1302 may be a UE or wireless communication device (e.g., the UE 120 and/or the like). In some aspects, the apparatus 1302 includes a reception module 1304, a determining module 1306, an allocating module 1308, and/or a transmission module 1310.

The reception module 1304 may receive data 1312 from a BS 1250 (e.g., the BS 110 and/or the like). The data 1312 may include, for example, a downlink transmission, a downlink retransmission, downlink control information relating to a transmission or retransmission, and/or the like. The reception module 1304 may provide the data 1312, as 1314, to a determining module 1306. In some aspects, the reception module 1304 may provide part of the data 1312 for storage by a soft buffer of the apparatus 1302.

The determining module 1306 may receive the data 1314, and may determine whether traffic received by the reception module 1304 is associated with a first type of HARQ process or a second type of HARQ process. The determining module 1306 may provide data 1316 indicating whether the traffic is associated with the first type of HARQ process or the second type of HARQ process to an allocating module 1308.

The allocating module 1308 may allocate a sub-buffer for the traffic based at least in part on whether the traffic is associated with the first type of HARQ process or the second type of HARQ process. In some aspects, the allocating module 1308 may provide the traffic for storage by the sub-buffer, or may provide information to another module indicating that the traffic is to be stored by the sub-buffer. In some aspects, the allocating module 1308 may provide data 1318 to a transmission module 1310. The data 1318 may indicate that the transmission module 1310 is to provide an ACK or NACK for the traffic or for other traffic stored by the soft buffer. For example, when the allocating module 1308 causes the soft buffer to drop stored soft information, the allocating module 1308 may provide data 1318 indicating that the transmission module 1310 is to transmit a NACK for the stored soft information. The transmission module 1310 may transmit the data 1318, as data 1320, to the BS 1250.

The apparatus may include additional modules that perform each of the blocks of the algorithm in the aforementioned flow chart of FIG. 12. As such, each block in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 13 are provided as an example. In practice, there may be additional modules, fewer modules, different modules, or differently arranged modules than those shown in FIG. 13. Furthermore, two or more modules shown in FIG. 13 may be implemented within a single module, or a single module shown in FIG. 13 may be implemented as multiple, distributed modules. Additionally, or alternatively, a set of modules (e.g., one or more modules) shown in FIG. 13 may perform one or more functions described as being performed by another set of modules shown in FIG. 13.

Figure 14:
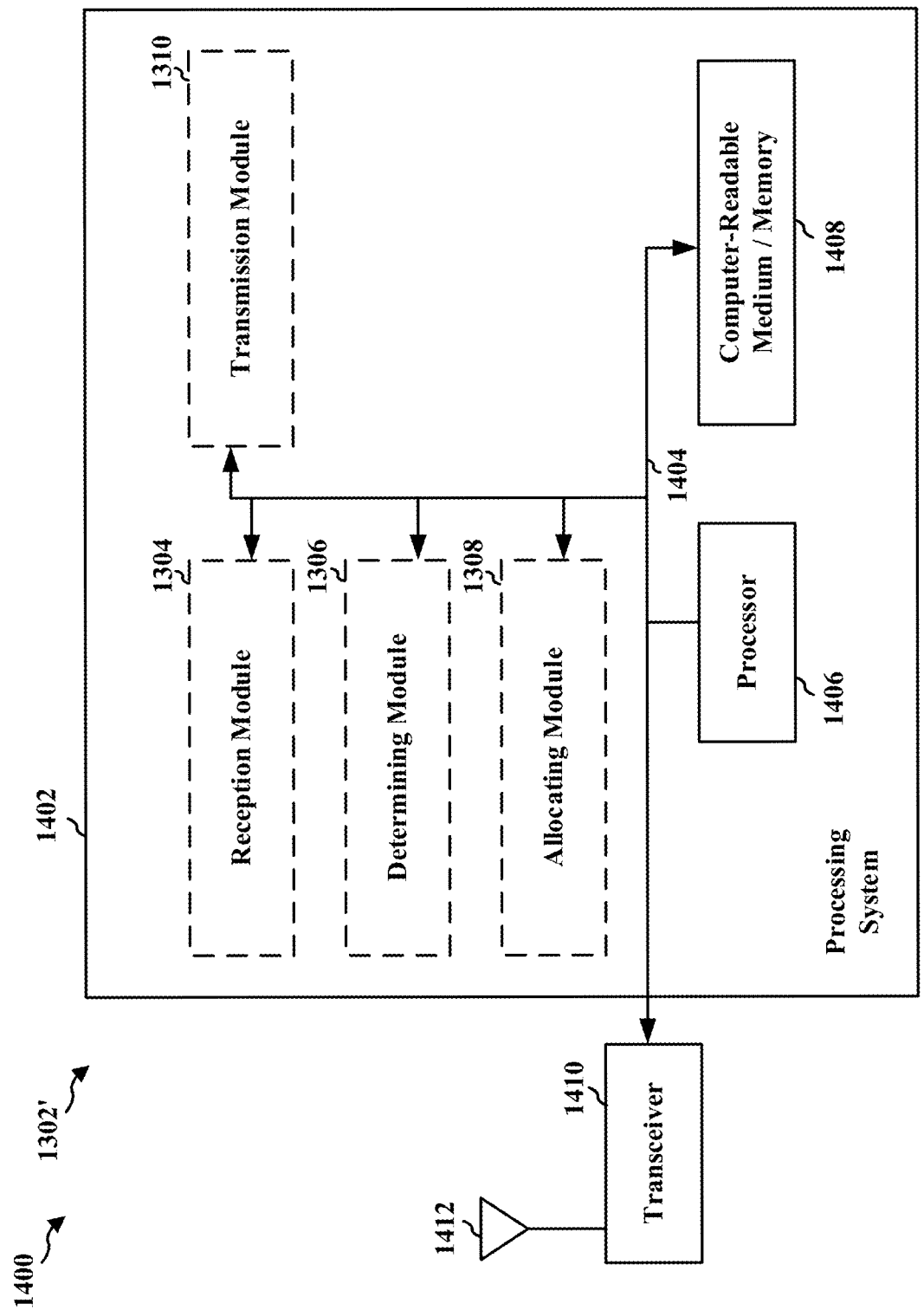
FIG. 14 is a diagram illustrating an example of a hardware implementation for an apparatus employing a processing system.

FIG. 14 is a diagram 1400 illustrating an example of a hardware implementation for an apparatus 1302' employing a processing system 1402. The apparatus 1302' may be a UE or wireless communication device (e.g., the UE 120, and/or the like).

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware modules, represented by the processor 1406, the modules 1304, 1306, 1308, 1310, and the computer-readable medium/memory 1408. The bus 1404 may also link various other circuits such as timing sources, peripherals, voltage regulators, and power management circuits, which are well known in the art, and therefore, will not be described any further.

The processing system 1402 may be coupled to a transceiver 1410. The transceiver 1410 is coupled to one or more antennas 1412. The transceiver 1410 provides a means for communicating with various other apparatus over a transmission medium. The transceiver 1410 receives a signal from the one or more antennas 1412, extracts information from the received signal, and provides the extracted information to the processing system 1402, specifically the reception module 1304. In addition, the transceiver 1410 receives information from the processing system 1402, specifically the transmission module 1310, and based at least in part on the received information, generates a signal to be applied to the one or more antennas 1412. The processing system 1402 includes a processor 1406 coupled to a computer-readable medium/memory 1408. The processor 1406 is responsible for general processing, including the execution of software stored on the computer-readable medium/ memory 1408. The software, when executed by the processor 1406, causes the processing system 1402 to perform the various functions described supra for any particular apparatus. The computer-readable medium/memory 1408 may also be used for storing data that is manipulated by the processor 1406 when executing software. The processing system further includes at least one of the modules 1304, 1306, 1308, and 1310. The modules may be software modules running in the processor 1406, resident/stored in the computer readable medium/memory 1408, one or more hardware modules coupled to the processor 1406, or some combination thereof. The processing system 1402 may be a component of the apparatus 1302/1302' and may include the memory 282 and/or at least one of the TX MIMO processor 266, the RX processor 258, and/or the controller/processor 280.

In some aspects, the apparatus 1302/1302' for wireless communication includes means for determining whether traffic received by the apparatus is associated with a first type of HARQ process or a second type of HARQ process; and allocating a sub-buffer for the traffic. The aforementioned means may be one or more of the aforementioned modules of the apparatus 1302 and/or the processing system 1402 of the apparatus 1302' configured to perform the functions recited by the aforementioned means. As described supra, the processing system 1402 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 14 is provided as an example. Other examples are possible and may differ from what was described in connection with FIG. 14.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a wireless communication device, comprising:
   determining whether traffic received by the wireless communication device is associated with a first type of hybrid automatic repeat request (HARQ) process or a second type of HARQ process,
      wherein the first type of HARQ process is associated with a first length transmission time interval (TTI) and the second type of HARQ process is associated with a second length TTI; and
   allocating a sub-buffer for the traffic,
   wherein the sub-buffer is selected from a set of sub-buffers of a first size when the traffic is associated with the first type of HARQ process, and
   wherein the sub-buffer is selected from a set of sub-buffers of a second size when the traffic is associated with the second type of HARQ process,
   wherein the first size is a multiple of the second size.

2. The method of claim 1, wherein allocating the sub-buffer for the traffic comprises:
   allocating the sub-buffer based at least in part on a HARQ identifier associated with the traffic.

3. The method of claim 2, wherein the HARQ identifier uses a same format for the first type of HARQ process and for the second type of HARQ process.

4. The method of claim 1, wherein the determination is based at least in part on whether scheduling information for the traffic is associated with the first length TTI or the second length TTI,
   wherein the second length TTI is shorter than the first length TTI, and
   wherein the first length TTI corresponds to the first type of HARQ process and the second length TTI corresponds to the second type of HARQ process.

5. The method of claim 1, wherein, when the sub-buffer stores data associated with one or more other HARQ processes and the wireless communication device does not have sufficient buffer size for the data and the traffic, the data is dropped for the sub-buffer to be used for the traffic.

6. The method of claim 5, wherein the one or more other HARQ processes are of the first type of HARQ process, and
   wherein the traffic is associated with the second type of HARQ process.

7. The method of claim 5, wherein the one or more other HARQ processes include a set of HARQ processes of the second type of HARQ process,
   wherein data associated with the set of HARQ processes is dropped from the sub-buffer.

8. The method of claim 7, wherein the traffic is associated with the first type of HARQ process.

9. The method of claim 5, wherein a non-acknowledgment (NACK) is transmitted for the data associated with the one or more other HARQ processes.

10. The method of claim 1, wherein the first type of HARQ process is associated with a first HARQ delay configuration and the second type of HARQ process is associated with a second HARQ delay configuration; and
    wherein the set of sub-buffers of the first size includes a first quantity of sub-buffers proportionate to the first HARQ delay configuration; and
    wherein the set of sub-buffers of the second size includes a second quantity of sub-buffers proportionate to the second HARQ delay configuration.

11. The method of claim 1,
    wherein a size of a set of sub-buffers to be used for the traffic is based at least in part on a maximum value of a number of HARQ processes for the first length TTI or a number of HARQ processes for the second length TTI.

12. The method of claim 1, wherein the set of sub-buffers of the first size includes a particular quantity of the set of sub-buffers of the second size,
    wherein the particular quantity is based at least in part on a ratio of a quantity of symbols or slots of a transmission time interval (TTI) of the first type of HARQ process and a quantity of symbols or slots of a TTI of the second type of HARQ process.

13. The method of claim 1, wherein a transmission time interval (TTI) of the first type of HARQ process is a one millisecond TTI; and
    wherein a TTI of the second type of HARQ process is a two symbol based TTI or a slot based TTI.

14. The method of claim 1,
    wherein a transmission of the traffic is received via the second length TTI, and
    wherein a retransmission of the traffic is received via the first length TTI.

15. The method of claim 14, wherein the retransmission of the traffic is allotted a sub-buffer of the second size based at least in part on the transmission of the traffic being received via the first length transmission time interval (TTI).

16. The method of claim 15, wherein the sub-buffer is a first sub-buffer; and
    wherein a second sub-buffer is allocated for other traffic of the second type of HARQ process,
    wherein the first sub-buffer and the second sub-buffer are included within a single sub-buffer of the first size.

17. The method of claim 1,
    wherein a transmission of the traffic is received via the first length TTI, and
    wherein a retransmission of the traffic is received via the second length TTI.

18. A wireless communication device, comprising:
    a memory; and
    at least one processor coupled to the memory, the memory and the at least one processor configured to:
       determine whether traffic received by the wireless communication device is associated with a first type of hybrid automatic repeat request (HARQ) process or a second type of HARQ process,
          wherein the first type of HARQ process is associated with a first length transmission time interval (TTI) and the second type of HARQ process is associated with a second length TTI; and
       allocate a sub-buffer for the traffic,
       wherein the sub-buffer is selected from a set of sub-buffers of a first size when the traffic is associated with the first type of HARQ process, and
       wherein the sub-buffer is selected from a set of sub-buffers of a second size when the traffic is associated with the second type of HARQ process,
       wherein the first size is a multiple of the second size.

19. The wireless communication device of claim 18, wherein the at least one processor, when allocating the sub-buffer for the traffic, is further configured to:
   allocate the sub-buffer based at least in part on a HARQ identifier associated with the traffic.

20. The wireless communication device of claim 19, wherein the HARQ identifier uses a same format for the first type of HARQ process and for the second type of HARQ process.

21. The wireless communication device of claim 18, wherein the determination is based at least in part on whether scheduling information for the traffic is associated with the first length TTI or the second length TTI,
   wherein the second length TTI is shorter than the first length TTI, and
   wherein the first length TTI corresponds to the first type of HARQ process and the second length TTI corresponds to the second type of HARQ process.

22. The wireless communication device of claim 18, wherein, when the sub-buffer stores data associated with one or more other HARQ processes, the data is dropped for the sub-buffer to be used for the traffic.

23. The wireless communication device of claim 18, wherein the first type of HARQ process is associated with a first HARQ delay configuration and the second type of HARQ process is associated with a second HARQ delay configuration; and
   wherein the set of sub-buffers of the first size includes a first quantity of sub-buffers proportionate to the first HARQ delay configuration; and
   wherein the set of sub-buffers of the second size includes a second quantity of sub-buffers proportionate to the second HARQ delay configuration.

24. The wireless communication device of claim 18, wherein the at least one sub-buffer of the first size includes a particular quantity of the sub-buffers of the second size,
   wherein the particular quantity is based at least in part on a ratio of a quantity of symbols or slots of a transmission time interval (TTI) of the first type of HARQ process and a quantity of symbols or slots of a TTI of the second type of HARQ process.

25. The wireless communication device of claim 18,
   wherein a transmission of the traffic is received via the second length TTI, and
   wherein a retransmission of the traffic is received via the first length TTI.

26. An apparatus for wireless communication, comprising:
   means for determining whether traffic received by the apparatus is associated with a first type of hybrid automatic repeat request (HARQ) process or a second type of HARQ process,
      wherein the first type of HARQ process is associated with a first length transmission time interval (TTI) and the second type of HARQ process is associated with a second length TTI; and
   means for allocating a sub-buffer for the traffic,
      wherein the sub-buffer is selected from a set of sub-buffers of a first size when the traffic is associated with the first type of HARQ process, and
      wherein the sub-buffer is selected from a set of sub-buffers of a second size when the traffic is associated with the second type of HARQ process,
      wherein the first size is a multiple of the second size.

27. The apparatus of claim 26, wherein the means for allocating the sub-buffer for the traffic further comprises means for allocating the sub-buffer based at least in part on a HARQ identifier associated with the traffic.

28. The apparatus of claim 27, wherein the HARQ identifier uses a same format for the first type of HARQ process and for the second type of HARQ process.

29. A non-transitory computer-readable medium storing one or more instructions for wireless communication, the one or more instructions comprising:
   one or more instructions that, when executed by one or more processors of a wireless communication device, cause the one or more processors to:
      determine whether traffic received by the wireless communication device is associated with a first type of hybrid automatic repeat request (HARQ) process or a second type of HARQ process,
         wherein the first type of HARQ process is associated with a first length transmission time interval (TTI) and the second type of HARQ process is associated with a second length TTI; and
      allocate a sub-buffer for the traffic,
         wherein the sub-buffer is selected from a set of sub-buffers of a first size when the traffic is associated with the first type of HARQ process, and
         wherein the sub-buffer is selected from a set of sub-buffers of a second size when the traffic is associated with the second type of HARQ process,
         wherein the first size is a multiple of the second size.

30. The non-transitory computer-readable medium of claim 29, wherein the one or more instructions, that cause the one or more processors to allocate the sub-buffer for the traffic, cause the one or more processors to:
   allocate the sub-buffer based at least in part on a HARQ identifier associated with the traffic.

* * * * *